two side corners or vertices of the middle hoe blade, so that in turning the two side hoe blades to adjust them to or from the middle hoe blade, their side corners or vertices will remain in contact with the corners of the middle hoe blade. By thus making the touching vertices of the three triangular hoe blades in a direct line with the two side supplemental sockets $b'\ b'$, the corners of the two side hoe blades are made to turn about the upper corners or vertices of the middle hoe blade as centers.

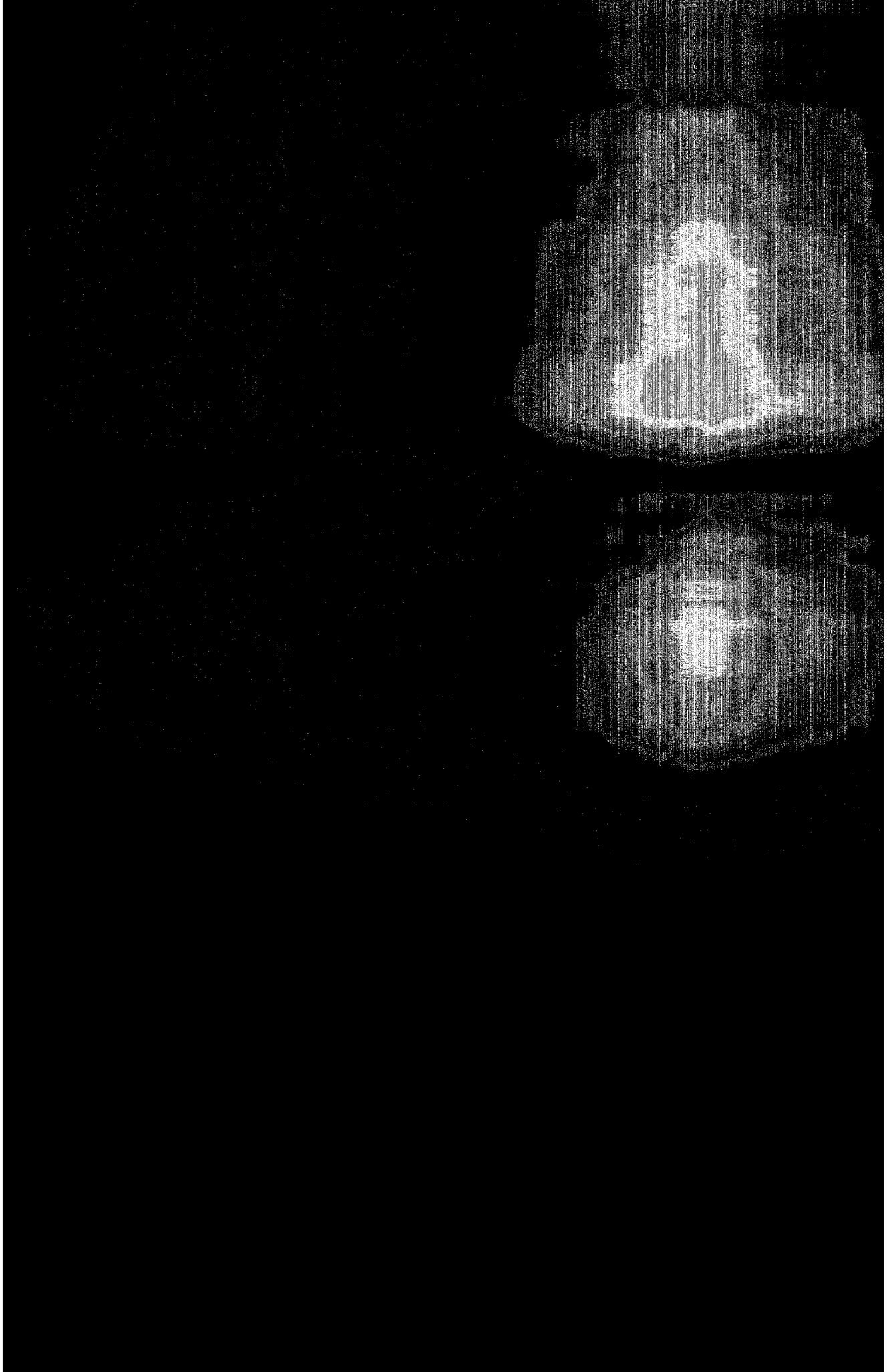

It will be understood by those skilled in the art that my invention may be practiced with a greater or less number of composite blades D than three. If the number of blades is increased, the angle of each blade should of course be accordingly diminished, and if the number of angular or pointed blades is diminished, the angle should of course be correspondingly increased. If only two composite blades D were employed the angle of each would be ninety degrees, so that the two together would form a straight cutting edge; and if the number were increased to four, the angle of each would of course be forty-five degrees.

The ferrule B with its several sockets $b$ and $b'\ b'\ b'$ may of course be of any suitable construction, and the shanks C of the angular blades D may also be differently constructed or differently curved or shaped from that shown in the drawings. All of the supplemental ferrules $b'$ are preferably permanently and rigidly attached to the main ferrule B which receives the handle. Though this is the preferable construction, it is not an essential one as all that is necessary is that all of the supplemental ferrules $b'$ and the main ferrule and handle A should be secured together or capable of being secured together.

I claim—

1. In a hoe the blade thereof formed of a middle angular part D and two separate and independently adjustable angular side parts D D, said side parts having a rotary adjustment in respect to said middle part to adapt them to form with said middle part a single cutting edge like an ordinary hoe or to form with said middle part three angular or pointed blades, substantially as specified.

2. In a hoe, the combination with a handle A of ferrule B, a number of supplemental ferrules $b'$ and a number of adjustable angular blades D each having an independently adjustable shank C fitting in said supplemental ferrule $b'$, substantially as specified.

3. In a hoe the combination with a handle A of ferrule B, a number of supplemental ferrules $b'$ and a number of adjustable blades D, each having an independently adjustable shank C fitting in said supplemental ferrule $b'$, and set screws F, substantially as specified.

4. In a hoe the combination of the handle and ferrule B having socket $b$ for the handle and supplemental sockets or ferrules $b'\ b'\ b'$, of the three angular pointed blades D furnished with shanks C fitting in said sockets $b'$, the angles of said blades being about sixty degrees so as to form a straight cutting edge when set together, substantially as specified.

5. The combination of handle A, ferrule B, supplemental ferrule $b'$, angular composite hoe blades D having shank C, and each having an independent rotary and longitudinal adjustment in its ferrule $b'$, substantially as specified.

FRED W. WITHAM.

Witnesses:
M. J. DOUGHERTY,
WM. S. COUSINS.